Patented Apr. 28, 1942

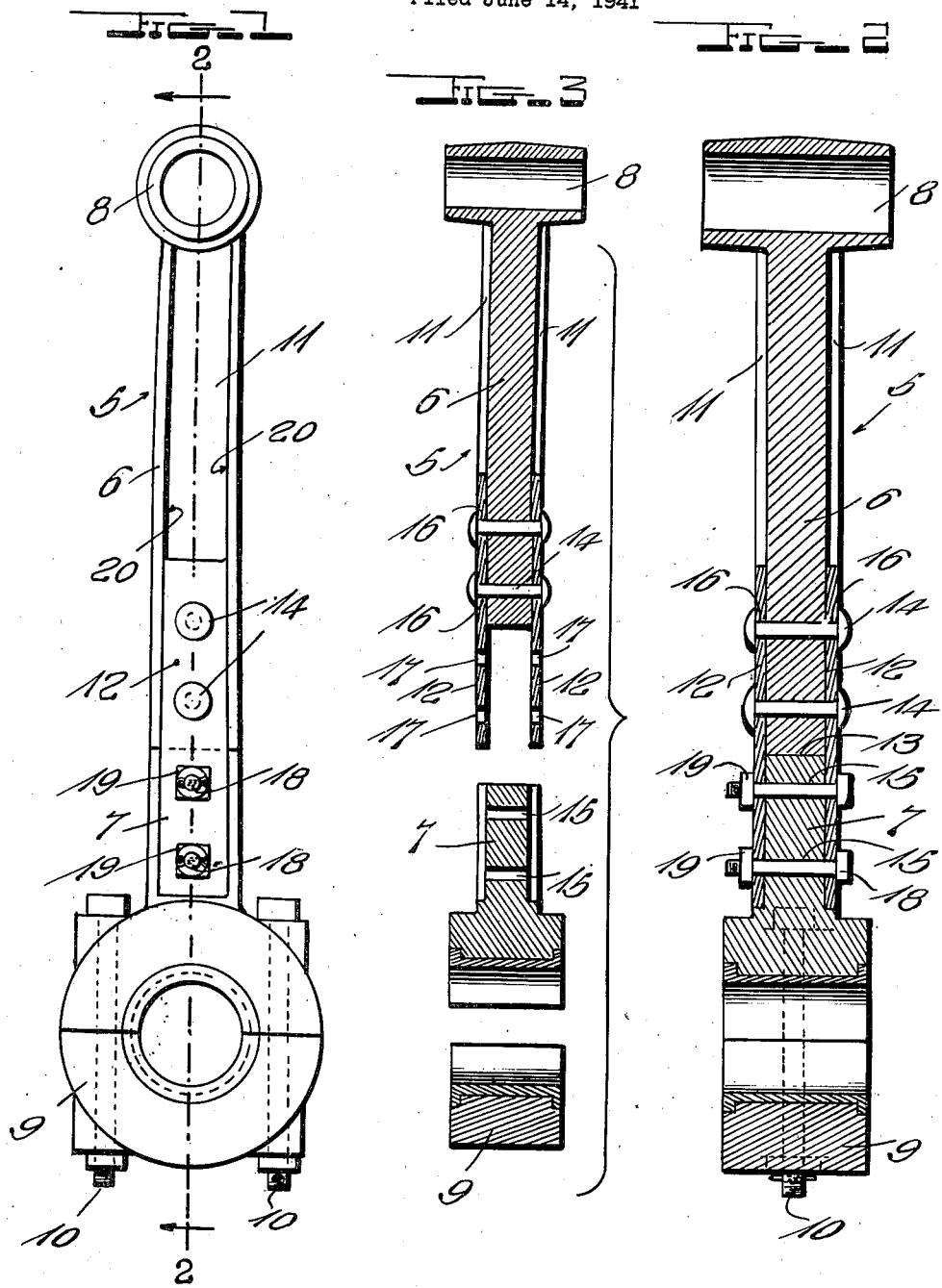

2,281,349

UNITED STATES PATENT OFFICE 2,281,349

CONNECTING ROD

Ledyard V. Brewin, Paulsboro, N. J.

Application June 14, 1941, Serial No. 398,131

1 Claim. (Cl. 74—579)

My invention relates to connecting rods and has as one of the principal objects thereof the provision of a connecting rod so constructed and arranged whereby the piston of an engine to which the rod is connected may be removed through the head of the cylinder without disconnecting the rod bearing from the crank shaft, also wherein the rod bearings may be removed from the crank shaft without removal of the pistons.

An important object of my invention is to provide a device of the character described which is simple in construction, durable in use, efficient in operation and economical in manufacture.

With the above and other objects in view, as will hereinafter appear, the invention consists in the combination, and arrangement of parts hereinafter set forth and illustrated in the accompanying drawing, from which the several features of the invention and the advantages attained thereby will be readily understood by those skilled in the art.

Referring to the drawing wherein like reference characters designate like parts throughout the several views:

Figure 1 is a side elevation of my invention.

Figure 2 is a sectional view taken on the line 2—2 of Figure 1.

Figure 3 is a view similar to Figure 2 but illustrating certain of the parts in disassembled relation.

In practising my invention, as illustrated in the drawing, I provide a connecting rod 5 formed with a pair of longitudinal sections 6 and 7 respectively normally connected together in end to end relation. The distal or oppositely disposed ends of the sections 6 and 7 are provided with piston-pin and crank-shaft bearings 8 and 9 respectively and with the latter being of the split type and having its sections normally connected together by means of bolts and nuts 10. Each side of the connecting rod, between the bearings 8 and 9, is formed with a channel 11 in which is disposed a plate 12 overlying the jointure 13 of the sections 8 and 9 as clearly illustrated in Figure 2.

Adjacent their abutting ends, the sections 6 and 7 are formed with pairs of openings 14 and 15 respectively registering with similar openings 16 and 17 formed in the plates 12. The openings 14 and 16 have extending therethrough rivets for securing the plates fixed to the section 6, while the openings 15 and 17 have extending therethrough bolts 18 equipped with nuts 19 for detachably securing the plates 12 to said section 7.

Obviously, by removing the bolts 18, the sections may be detached from each other to permit withdrawal of the section 6, together with the piston of the engine, through the head of the cylinder. The plates 12 are of a sufficient width whereby their side faces engage the opposed faces 20 of the side walls defining the channels 11 and thus coact with said side walls to preclude relative lateral movement between the sections 6 and 7.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What I claim is:

In a connecting rod for internal combustion engines, a member having oppositely arranged channeled faces extending the full length thereof and including separable rigid sections arranged in endwise abutting relation, a piston pin bearing integral with one of said sections, a crank shaft bearing integral with the other section, said sections adjacent the abutting ends each having a group of openings opening through the channeled faces, elongated flat connecting plates lying in the channeled faces across the abutting ends of said sections and provided with openings aligning with the openings in the sections, rivets extending through the openings of one of the sections and openings of the plates for permanently securing the latter to the latter-named section, and bolts extending through the openings of the other section and openings of the plates to detachably connect the sections whereby one of the sections may be removed through a cylinder head end of a cylinder of an engine along with the piston connected thereto, said plates snugly engaging the channeled faces permitting the latter to assist the rivets and bolts in preventing the plates from having relative movement to the sections.

LEDYARD V. BREWIN.